April 2, 1968     JEAN-PIERRE A. PUGNAIRE     3,376,537

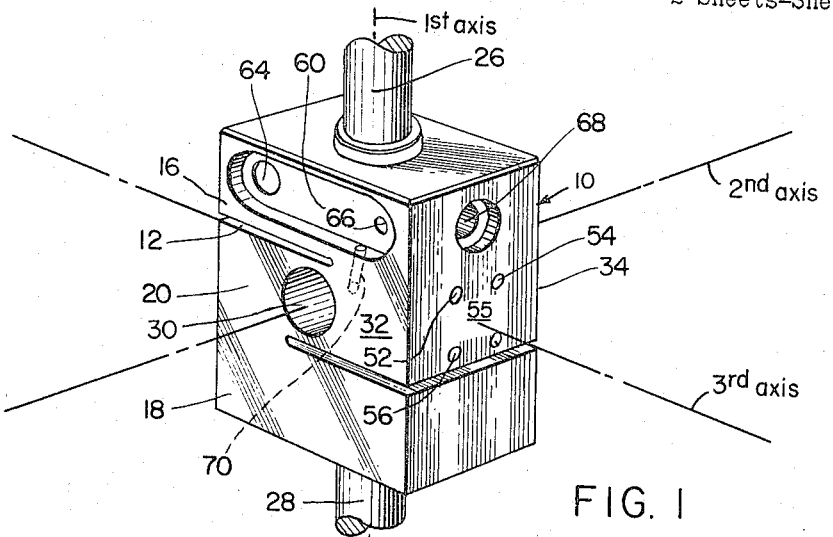

SHEAR STRAIN LOAD CELL

Filed Feb. 11, 1966     2 Sheets-Sheet 2

INVENTOR.
JEAN-PIERRE A. PUGNAIRE
BY
Blair Buckles + Cesari
ATTORNEYS

United States Patent Office 3,376,537
Patented Apr. 2, 1968

3,376,537
SHEAR STRAIN LOAD CELL
Jean-Pierre A. Pugnaire, Arlington, Mass., assignor, by mesne assignments, to Bytrex, Inc., Waltham, Mass., a corporation of Massachusetts
Continuation-in-part of application Ser. No. 346,028, Feb. 19, 1964. This application Feb. 11, 1966, Ser. No. 540,109
18 Claims. (Cl. 338—5)

ABSTRACT OF THE DISCLOSURE

The instant load cell converts tension and compression forces to shear strain in a thin disk mounted in a member that receives the load in a direction transverse to the small thickness of the disk. The member is arranged to have passing therethrough the neutral axis about which it bends when the load has components directed parallel to the thickness dimension of the disk, and the disk is disposed on this neutral axis. Shear strain in the disk can be further concentrated along the disk portions of maximum strain due to the shear by weakening other portions of the disk.

---

This invention is a continuation-in-part of the pending application Ser. No. 346,028, filed Feb. 19, 1964, now abandoned assigned to the assignee hereof.

This invention relates to an improved load cell of the type used to measure tension and compression loads. More specifically, it relates to a generally S-shaped load cell in which forces exerted on the upper and lower arms are converted to shear stresses in a thin section of the middle arm. The resulting strain in this section is detected by a strain gage unit, and with the configuration described below, the output of the gage unit is a linear function of the monitored linear loads and relatively independent of spurious loads encountered when using the load cell.

Load cells of the type to which the invention relates measure linear forces, i.e. tension and compression forces, acting in a given direction. In order to provide accurate measurements of such forces, a load cell should be relatively insensitive to bending moments and also to linear forces which are orthogonal to the forces monitored by the cell. The reason for this requirement is that such inputs are often encountered in load measuring arrangements. For example, when several load cells are used to weigh a large object such as a tank or bin, there may often be a substantial side thrust due to temperature variations and this thrust may well result in undesired inputs of both types. As another example, a bending moment may result when the monitored load is not aligned with the axis of the load cell.

A prior strain gage load cell providing a number of desirable features comprises three parallel arms interconnected to form an S-shaped unit. The monitored load is applied to the outer arms of the S along a line extending through the middle arm. The middle arm has a pair of thin-walled sections or disks coplanar with the S and as a result, the load transmitted to this arm from the outer arms results in concentrated shear stresses on these sections. Strain gages attached to the thin section are oriented to respond to shear therein and thereby sense the monitored load. The present invention is directed to an improved load cell of this type.

More specifically, an object of the invention is to provide an improved load cell, adapted for measurement of tension and compression loads, which efficiently converts applied loads to concentrated shear stresses.

Another object of the invention is to provide a load cell of the above type in which shear stresses are readily measured by conventional strain gage instrumentation.

A further object is to provide a load cell of the above type exhibiting insensitivity to bending moments and side thrusts exerted in conjunction with the load being measured.

Yet another object of the invention is to provide a load cell of the above type which is relatively insensitive to temperature gradients therein.

A still further object of the invention is to provide a load cell of the above type which has a relatively small size for a given load-bearing capacity and yet is characterized by relative ease of manufacture.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a pictorial representation of a load cell embodying the invention;

FIG. 2 is a side view of the load cell shown in FIG. 1;

FIG. 3 is a section taken along line 3—3 of FIG. 2; and

Figure 4:
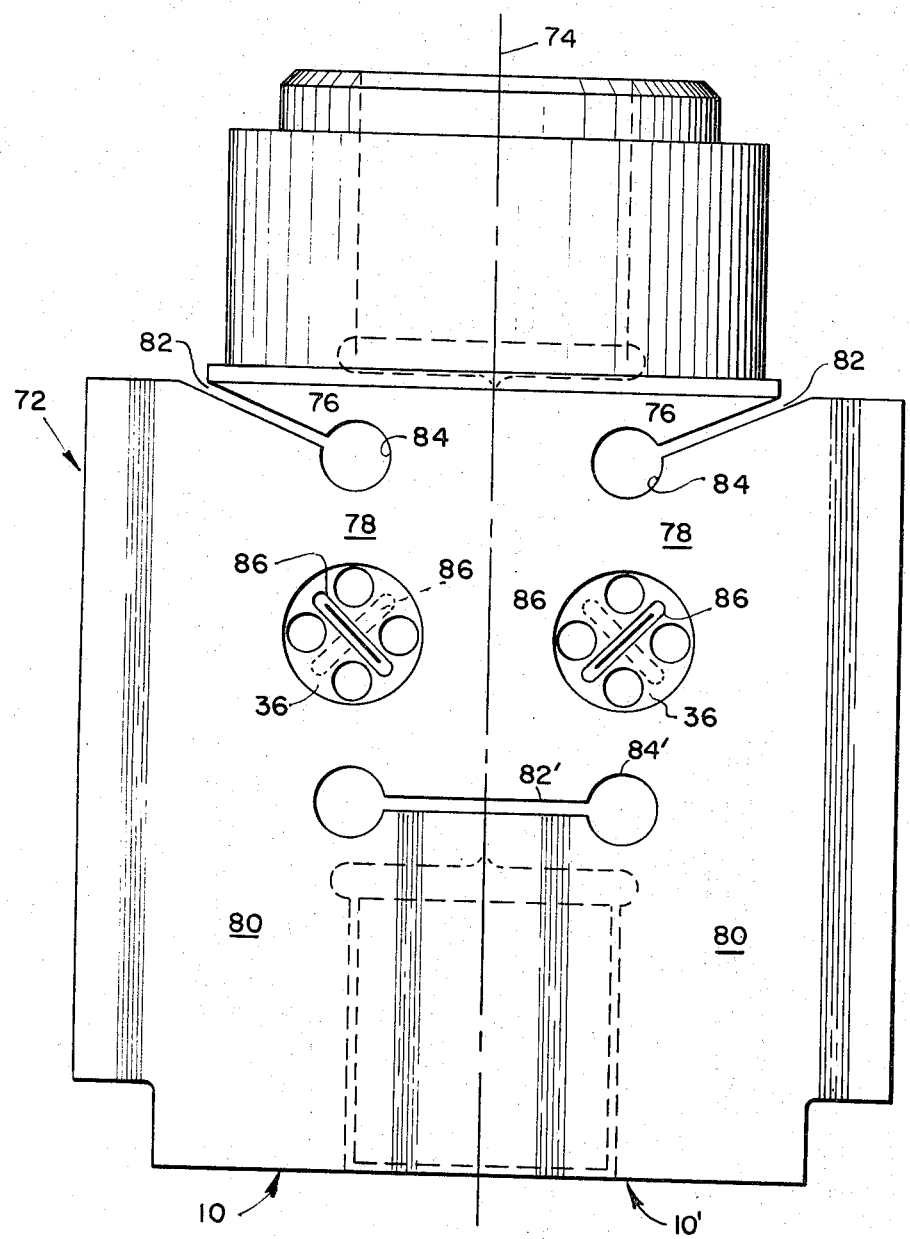
FIG. 4 is a side view, similar to FIG. 2, of a dual load cell embodying the invention.

In general, the present invention is embodied in an S-shaped load cell of the type described above in which a single, centrally-located, stress-supporting disk replaces the two outer disks previously used. This materially aids in desensitizing the cell to certain undesired lateral loads. It also reduces the cost of manufacturing the cell.

This latter advantage is enhanced by the provision of a number of holes extending through the disk. The holes decrease the strength of the disk and thereby increase the amount of strain therein for a given load on the cell. This in turn results in an increase in sensitivity. Therefore, for a given sensitivity the disk may be made thicker and the absolute tolerance limitations on its thickness are thus significantly eased. Furthermore, the holes serve to concentrate the stress in certain portions of the disk and also serve as guides for the placement of strain gages on these high stress areas.

I have also increased the sensitivity of the load cell by removing material from certain portions thereof near to the disk. Removal of this material further concentrates the monitored load on the disk thereby increasing the strain therein in response to the monitored load. At this same time, because of the relatively central locations of the places from which the material is removed, the resistance of the load cell to bending moments is only slightly affected. Thus, there is an overall increase in the ratio of sensitivities to the monitored and spurious loads.

With reference to FIG. 1, a load cell embodying the invention may be formed from a block, generally indicated at 10, provided with slots 12 and 14. The slots form the block 10 into an S-shaped member having upper and lower arms 16 and 18 and a middle arm 20. As shown in FIGS. 2 and 3, arms 16 and 18 may be provided with threaded holes 22 and 24 accommodating shafts 26 and 28 (FIG. 1) which apply the monitored load to the load cell. A bore 30 extends inwardly from a face 32 of the arm 20 and also from the opposite face 34.

More specifically, as shown in FIG. 3, the bore 30 is in two parts, 30a and 30b, whose inner ends are separated by a thin-walled section or disk 36 in which are concentrated the stresses in the arm 20 due to tenison or compression loads exerted by the shafts in the holes 22 and 24. These stresses are sensed by means of strain gages 38 and 40 bonded to the disk.

The load cell thus has an H-shaped cross section in the horizontal plane transverse to both FIGS. 2 and 3 and passing through the center of the bore 30. The disk 36 forms the "cross-piece" of the H-shape and the ends 20a and 20b of the arm 20 constitute the "uprights" of the H. The H-shape is symmetrical in that the "cross-piece" passes through the center of the arm 20 as measured along the direction transverse to the plane of the disk.

To clarify further references to the directions of the various forces and torques associated with the load cell, the direction of the monitored load is along a first axis parallel to the axis of the holes 22 and 24, i.e. along the line 3—3 of FIG. 2. The shear stresses in the arm 20 resulting from the monitored load are parallel to this axis. The corresponding shear planes in the arm 20 are parallel to the axis of the holes 22 and 24 and perpendicular to the faces 32 and 34, i.e. parallel to the first axis and to a second axis orthogonal to the first axis and along which the thickness dimension of the disk is measured. Thus the shear planes are perpendicular to the plane of FIG. 2, and parallel to the section shown in FIG. 3. Thus, these shear planes are perpendicular to the plane of the S and also preferably perpendicular to the disk 36. A third axis, along which the height of the block 10 is measured, is orthogonal to each of the first and second axes.

As best seen in FIG. 2, the disk 36 is provided with a set of four holes 42a–42b extending therethrough. The orientation of these holes will be best understood from an analysis of the manner in which a tension or compression force exerted by the shafts 26 and 28 (FIG. 1) along the axis of the holes 22 and 24 acts on the disk 36. For example, assume a compression force, in which case, the arm 16 will exert a downward force on the right end 20a of the arm 20 and the arm 18 will exert an upward force on the left end 20b. Specifically, the downward force will occur in the region to the right of the slot 12 and the upward force in the region to the left of the slot 14. The coaction of these forces results in shear stress in the central portion of the arm 20, i.e. between the inner ends of the slots 12 and 14. The shear stress is supported by the material in this middle portion, i.e. the disk 36 and the webs 44 and 46 between the bore 30 and the slots 12 and 14 respectively. The physical relationship of these latter parts is best seen in FIG. 3.

This shear stress is fairly well concentrated along a plane midway between and parallel to the slots 12 and 14, i.e. passing through the center of the disk 36. Moreover, the stress manifests itself in the form of tension and compression stresses oriented at 45 degrees with respect thereto. Since the shear stress is vertical, with reference to FIG. 2, i.e. parallel to the monitored forces, the tension and compression stresses in the disk 36 are at 45 degrees with respect to the vertical. Therefore, they are readily detected by means of strain gages, such as the gages 38 and 40, disposed in these orientations. Specifically, in the arrangement shown, compressive loading places the gage 38 in compression and the gage 40 in tension. Therefore, when the gages are connected in adjacent arms of a Wheatstone bridge, the strains imposed on them are additive with respect to the electrical output of the bridge.

The holes 42a–42d cannot, of course, support any stresses. Therefore, they serve to channel the stresses in the disk 36 into the beam-like areas between them, i.e. the portions covered by the strain gages 38 and 40. Thus the shear stresses resulting from the monitored loads applied to the cell are, in effect, concentrated into beams whose locations and directions correspond to the measurements made by strain gages bonded to the beams, and this enhances the sensitivity of the load cell to such loads.

Another function of the holes 42a–42d has to do with manufacture of the load cell. The sensitivity of the load cell is proportional to the magnitude of the stresses in the disk 36 for a given applied load. Specifically, if the disk 36 is made thinner, it will undergo a greater strain for a given load or, conversely, for a given electrical output the applied load will be decreased. When the cell is to be used for the measurement of relatively small loads, the disk must be made quite thin if the holes 42a–42d are omitted. However, assuming a given tolerance for the depths of the bore parts 30a and 30b, the percentage variation of the thickness of a thin disk is greater than that of a thick one. Thus in the case of a thin disk, sensitivity of the load cell cannot be maintained within tolerances as close as those attainable with a thicker disk.

This problem is overcome by means of the holes 42a–42d which, because they concentrate the stresses in relatively small portions of the disk 36, provide the same sensitivity in a thick disk as is found in a much thinner disk made without the holes. With the thick disk and the same tolerance limits on the depths of the bore 30, a much closer control over the sensitivity of the load cell is obtained.

The load cell, as thus far described, possesses good linearity. In fact, a linearity of 0.05 percent is readily attainable. The nonlinearity present is due in part to the fact that the strain gages 38 and 40 undergo slightly different stains in response to the monitored load. The reason for this is as follows. The gages may be considered as attached to the beams defined by the holes 42a–42d. The beam to which that gage 38 is bonded extends, in essence, between the inner ends of the slots 12 and 14, while the beam to which the gage 40 is bonded extends more or less between the midpoints of the slots. As a result, the latter beam is not as stiff as the former and therefore does not undergo as much strain. Accordingly, the strain gage 40 supplies a very slightly smaller output signal than the gage 38.

One way in which this disparity in stiffness of the beams can be corrected is by reducing the cross section of the stronger beams and thereby reducing its stiffness. This can be accomplished, for example, by means of small holes 48 and 50 extending through the disk 36 at the ends of the strain gage 38. We have found that these holes, which illustratively may have about half the diameter of the holes 42a–42d, materially improve the linearity of the load cell.

It will be apparent that in place of reduction of material thickness by the holes 42a–42d, which extend through the disk 36, reduction of cross section for stress concentration into beams can be accomplished by recesses or channels which do not go all the way through the disk.

As best seen in FIGS. 2 and 3, a pair of holes 52 and 54 extend into the web 44 from the face 55 (FIGS. 1 and 2) of the load cell and past the bore 30. As shown in FIG. 3, the holes 52 and 54 are on opposite sides of the disk 36 and spaced a substantial distance inward from the outer extremities of the webs 44 and 46, i.e. the edges of the webs bordering on the faces 32 and 34. A pair of similar holes 56 and 58 extend from the face 55 into the web 46. Corresponding as they do to removal of material from the webs 44 and 46, the holes 52–58 serve to weaken the webs in the inner portions thereof near the disk 36 while leaving unaffected the outer portions adjacent to the faces 32 and 34. Thus with regard to the shear stresses imposed on the middle arm 20 by the monitored load, the webs 44 and 46 are substantially weakened, with a resulting increase in the stresses in the disk 36 and a further enhancement of the sensivity of the load cell.

On the other hand, the holes 52–58 affect only insubstantially the resistances of the webs to bending moments exerted in the transverse plane, i.e. to the right or left of the vertical of FIG. 3. The reason for this is that the outer, unweakened portions of the arm 20, distant from the neutral axis (as best seen in FIG. 3), provide almost all the resistance to such bending. Referring to FIG. 3, these unweakened portions of the arm 20 are the portions of the webs 44 and 46 between the thin edges of the webs and the holes 52–58. And the neutral axis for the transverse bending, as is apparent from the symmetry of the illustrated load cell, extends in the direction transverse to the plane of FIG. 3 and parallel to the plane of FIG. 2 and passes through the disk 36 substantially midway between its surfaces to which the gages are bonded and substantially midway between its radially uppermost and bottommost edges. Thus the neutral axis parallel to the third axis shown in FIGURE 1.

It will be observed that there is an inner limit to the positions of the holes 52–58. If they are too close to the disk 36, the portions of the webs 44 and 46 between the holes may be too small to transfer appreciable stresses to the disk.

The relative insensitivity to bending moments of this type is one of the important features of the present invention. In prior load cells, making use of a pair of disks symmetrically disposed about the neutral axis for such moments, the strains imposed on the disks as a result of bending are substantially greater. This is because the disks are disposed at some distance from the axis. The bending places one disk in compression and the other in tension. The resulting strains on the two disks can be largely eliminated from the electrical output of the load cell by the use of compensating strain gages, that is, the use of a pair of strain gages on each disk. However, this requires careful matching of the characteristics of two pairs of gages and even then complete compensation is extremely difficult to obtain. Moreover, when a pair of strain sensing disks are used, use of holes 52–58 not only increases the sensitivity to the monitored load in the manner described above, but also substantially increases the sensitivity to the bending moments, so that there is little if any net gain in overall signal-to-noise ratio.

On the other hand, with the single disk 36 disposed on the neutral axis as described above, negligible strains are present on opposite faces of the disk. Hence there is minimal response to the postulated bending moment. This undesired signal can be further reduced by placing a pair of gages on each side of the disk so that each pair undergoes strain in the same direction as a resulting of the bending. The resulting individual strain produced signals are cancelled out in the bridge circuit incorporating the gages. More specifically, the gages 38 and 40 are on one side of the disk and a second pair 38a and 40a in register with these gages are affixed to the other side of the disk. The four gages need not be matched to the same degree as in the prior construction.

For the same reasons, the load cell exhibits a decreased sensitivity to a side thrust into the transverse plane, i.e. left-right thrust on the arms 16 and 18 in FIG. 3. A force of this type results in twisting of the middle arm 20, with the strain due to such twisting being at a minimum along the center line of the arm, which is perpendicular to the face 55 and which in the illustrated load cell is the neutral axis described above. If only two gages are used, it is desirable that they be on opposite sides of the disk 36 (e.g. gages 40 and 38a) so that the outputs of the individual gages due to this strain will cancel out in the bridge circuit incorporating the gages.

The present invention also provides improved temperature characteristics, particularly where a temperature gradient exists across the load cell. With such a gradient the prior cells using a pair of disks may have substantially different temperatures at the two disks. With strain gages whose characteristics vary with temperature this makes compensation considerably more difficult. Moreover, it makes it extremely difficult to provide for cancellation of the unwanted signals from the bending moment and side thrust discussed above. With the single disk on the other hand, the gages are at essentially the same temperature, thereby materially alleviating the temperature gradient problem.

As shown in FIG. 1, the load cell may be provided with a recess 60 in the upper arm 16 and a similar recess 62 (FIG. 3) on the opposite side of this arm to accommodate portions of the electric circuit associated with the cell. In particular, the recesses may contain resistors forming the other two arms of the bridge circuit incorporating the gages 38 and 40, together with other resistors used for compensating and calibrating purposes. A passage 64, shown in FIGS. 1 and 2, interconnects the recesses 62 and 64. A second passage 66 communicates between the recesses and a bore 68, which may be provided with a suitable electrical connector (not shown) for connection of the internal circuitry to external readout equipment, etc.

A passage 70 (FIGS. 1 and 2) communicates between the recess 60 and the bore 30 to provide for electrical connection between the gages 38 and 40 and the circuit elements located in the recess. If gages are disposed on opposite sides of the disk 36 a similar passage may be provided on the other side of the load cell. The recess 60 and the bore 30 may be sealed against environmental changes. Preferably sealing of the bore 30 is accomplished by means of flexible diaphragms which do not support a significant portion of the load imparted to the arm 20.

Thus I have described an improved force-measuring load cell of the type having an S configuration and employing shear-sensing strain gages in the middle arm of the S. To amplify the shear stress this arm is bored leaving a thin disk in the bore which accommodates a large portion of this stress. In accordance with the present invention only a single centrally located disk is used, thereby substantially increasing the ratio of sensitivity for the monitored load to the sensitivity for spurious loading on the cell. The use of a single disk also greatly reduces the effect of temperature gradients in the cells and furthermore, it permits the removal of material from the webs above and below the disks for a further increase in the desired sensitivity without significantly increasing the undesired sensitivity.

According to another aspect of the invention, material may be removed from the disk by, e.g. drilling holes through it, so as to effectively form stress supporting beams to which the strain gages are attached, and in which the measured stress is concentrated. As pointed out above, this permits the use of a thicker disk for a given load supporting capacity, thereby providing greater accuracy without tightening tolerance requirements in the manufacture of the load cell. Moreover, for a given thickness the holes increase the sensitivity of the cell. Additional material may be removed from one of the beams formed by these holes in order to improve the linearity of the load cell as compared with prior cells of this type. It should be noted that these latter features of the invention are applicable to load cells using a pair of disks, although the advantages are more fully realized with the use of a single disk in accordance with the present invention.

The load cell 10 of FIGS. 1–3 can be arranged in parallel with another identical cell 10' in the manner shown in FIG. 4 to provide a dual cell 72. The two cells 10–10' are machined from a single block of metal as illustrated or are otherwise arranged integral with each other so that the load can be applied along the centerline 74 of the dual cell rather than being applied separately to each constituent cell vertically in line with the disks 36.

As in FIGS. 1–3 each constituent cell 10–10' has three arms 76, 78 and 80 arranged in a generally S-shape. The upper slot 82 of each cell, forming the arms 76 and 78, is suitably inclined downward to its inner end where it has an enlarged stress-distributing cylindrical surface 84. The lower slot 82' has corresponding enlarged stress-distributing cylindrical surfaces 84'. Only one strain gage 86 is on each side of each disk 36—36, with the gages on likefacing slides of the two disks being substantially orthogonal to each other.

The two constituent cells 10–10' are arranged with their S shapes being back-to-back, rather than back-to-nose. With this arrangement, the load is readily applied substantially uniformly to the two disks 36—36.

Another advantage of the back-to-back arrangement is that spurious loads directed to the right and left in FIG. 4 increase the horizontal shear stress in one disk and diminish the shear stress in the other disk by substantially the same amount. The four strain gages 86—86 can be placed in different arms of a four-arm bridge circuit to cancel out this imbalance.

It should be noted that the two disks of the dual cell are spaced apart in a direction transverse to the spacing between the two prior art disks described above. Thus, both disks 36—36 are on the neutral axis for bending moments that tend to bow the load cell with respect to the plane of FIG. 4. In other words, in the plane transverse to the plane of FIG. 4 and through the disks 36—36, the dual cell 72 has a cross section that is in the form of a symmetrical H having a third "upright"—formed by the portion of the arms 78—78 between the disks—bisecting the "crosspiece." The corresponding cross section of the prior dual-disk cell has an H-shape in which there are two "cross-pieces" formed by the two disks.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A load cell comprising
(A) a block having first and second substantially opposed sides each extending along first and second axes and spaced apart along a third axis where said axes are mutually orthogonal,
(B) means forming first and second overlapping slots
   (1) each extending from one of said first and second sides toward the other said side and spaced along said first axis from the other slot,
   (2) so as to define an S-shaped member having first, second and third arms with said second arm between and connected to said first and third arms,
(C) means for applying to said first and third arms a load having components directed along a line parallel to said first axis,
(D) said second arm having a bore extending therein parallel to said slots along said second axis and disposed in the region of overlap of said slots, thereby to define a web between said bore and each slot,
(E) a thin disk extending across said bore and disposed on said line along which said load components are directed, and
(F) a strain gage fixed to a surface of said disk for measuring shearing strains developed in said disk by a load applied to said cell.

2. The combination defined in claim 1 in which
(A) said disk has portions of reduced thickness defining a pair of beams oriented in the direction of maximum stress due to shear resulting from said load, and
(B) said cell includes a pair of strain gages affixed to said beams and oriented in the direction of said maximum stress so as to sense the strains therein.

3. The combination defined in claim 2 including a portion of reduced thickness arranged in at least one of said beams
to reduce the difference in the magnitudes of the stresses in said beams.

4. The combination defined in claim 2
(a) in which each of said webs extends laterally, along the axis of said bore, on both sides of said disk, and
(b) including means forming voids in said webs
   (1) on opposite lateral sides of the portions thereof from which said disk extends and
   (2) substantially laterally removed from the outer edges of said webs.

5. The combination defined in claim 1
(a) in which each of said webs extends laterally, along the axis of said bore, on both sides of said disk, and
(b) including means forming voids in said webs
   (1) on opposite lateral sides of the portions thereof from which said disk extends and
   (2) substantially laterally removed from the outer edges of said webs,
(c) thereby increasing the shear in said disk without a commensurate increase in the stresses therein resulting from bending due to forces on said first and third arms parallel to the axis of said bore.

6. A force-measuring device comprising
(A) a load-bearing structure having
   (1) first and second relatively thick load-receiving members adapted to receive a load applied parallel to a first axis,
   (2) a first relatively thick load-transmitting member
      (a) positioned intermediate said load-receiving members,
      (b) separated from said load-receiving members at selected portions by gaps spaced along an axis parallel to said first axis and extending between said load-transmitting member and said load-receiving members whereby relative motion between the separated portions in a direction parallel to said first axis may be obtained when a load is applied in said direction,
      (c) connected to said load-receiving members at other portions lying at opposite ends of said load-transmitting member along a third axis perpendicular to said first axis whereby stresses caused by the application of a load to said load-receiving sections may be transmitted to said load-transmitting section only through said connected portions,
      (d) having a shear section intermediate said connected portions for supporting shearing forces developed by said load,
      (e) having a first main bore extending through said shear section along an axis parallel to a second axis which is mutually perpendicular to the first and third axes, and
      (f) including a first thin section positioned within said main bore with its thin dimension extending in the direction of the second axis and its length and width dimensions extending in a first plane parallel to the plane formed by said first and third axes, said first plane constituting the neutral bending plane of said device with respect to bending moments about an axis parallel to said third axis,
      (g) whereby said shear stresses developed in said shear section are concentrated in said thin section and are minimized by the positioning of said thin section in said neutral plane, and
(B) strain sensing means mounted on said thin section in the plane of said length and width dimensions for sensing tensile and compressive stresses developed therein by said shear stresses.

7. The force-measuring device defined in claim 6 in which said strain sensing means comprises at least one pair of strain gages
   (A) mounted on said thin section mutually orthogonal to each other, and
   (B) each oriented in a direction of maximum tensile or compressive stress developed in said thin section by shearing stresses in said thin section.

8. The force-measuring device defined in claim 7 in which said strain gages are each oriented at approximately 45 degrees to the load applied parallel to said first axis.

9. The force measuring device defined in claim 7 in which said thin section has portions of reduced thickness measured in a direction parallel to said second axis and defining therebetween radially-extending segments of increased stress in said thin section, whereby said strain gages may be mounted on said segments to sense said increased stress.

10. The force-measuring device defined in claim 9 in which said portions of reduced thickness extend completely through said thin section, whereby said segments of increased stress are formed by the remaining portions of said thin section.

11. The force-measuring device defined in claim 10 in which a first pair of said segments has an area of reduced thickness located at the outer radial extension of each segment of said pair of segments, to thereby reduce the effective stiffness of the respective segments.

12. The force-measuring device defined in claim 6 in which said shear section includes a first pair of bores
   (A) symmetrically located on opposite sides of said thin section and spaced therefrom along said second axis, and
   (B) extending adjacent said main bore in a direction parallel to said third axis,
   (C) whereby the stresses developed in said shear section by said load may be further increased in the vicinity of said thin section.

13. The force-measuring device defined in claim 12 which includes a second pair of bores
   (A) symmetrically located on opposite sides of said thin section and spaced therefrom along said second axis, and
   (B) extending adjacent said main bore in a direction parallel to said third axis and on the side of said main bore opposite said first pair of bores,
   (C) whereby the stress developed in said shear section by said load may be further increased in the vicinity of said thin section.

14. A force-measuring device according to claim 6 in which said relatively thick load-transmitting member and said thin section are formed integral with each other, said thin section being defined by pairs of bores extending inwardly from opposite faces of said device in a direction parallel to said second axis.

15. A force-measuring device according to claim 6 in which said gaps extend transversely to said first axis and terminate in said shear section adjacent said main bore, said gaps being positioned respectively above and below said main bore as measured along an axis parallel to said first axis to thereby define a pair of stress-concentrating webs adjacent said bore, the load applied to said device being transmitted from one load-receiving member to the other through said webs.

16. A force-measuring device according to claim 6 which includes
   (A) a second main bore extending through said shear section along an axis parallel to said second axis, the axis of said second main bore being displaced from the axis of said first main bore along the direction of said third axis,
   (B) a second thin section positioned within said second main bore with its thin dimension extending in the direction of the second axis and its length and width dimensions extending in said neutral plane coplanar with the length and width dimensions of said first thin section, whereby said shear stresses developed in said shear section are further concentrated in said second thin section and are minimized by the positioning of said second thin section in said neutral plane, and
   (C) strain-sensing means mounted on said second thin section in the plane of said length and width dimensions for sensing tensile and compressive stresses developed therein by said shear stresses.

17. A force-measuring device according to claim 16 in which said gaps include
   (A) first and second gaps extending inwardly toward said main bores from side walls of said force-measuring device and positioned on one side of said main bores, and
   (B) a third gap positioned on the other side of said main bores and symmetric thereto, said third gap and said first and second gaps forming web portions with said first and second main bores,
   (C) whereby stresses generated in said device by said load may be transmitted from one load-receiving section to another through said web portions.

18. A force-measuring device according to claim 17 in which said relatively thick load-transmitting member and said thin section are formed integral with each other, said thin section being defined by pairs of bores extending inwardly from opposite faces of said device in a direction parallel to said second axis.

References Cited

UNITED STATES PATENTS

| | | | |
|---|---|---|---|
| 2,597,751 | 5/1952 | Ruge | 73—141 |
| 3,004,231 | 10/1961 | Laimins | 338—5 |
| 3,034,342 | 5/1962 | Regner | 73—88 |
| 3,130,383 | 4/1964 | Hottinger | 73—141 |
| 3,180,139 | 4/1965 | Soderholm | 73—141 |
| 3,184,964 | 5/1965 | Hedrick et al. | 73—141 |
| 3,196,676 | 7/1965 | Pien | 73—141 |
| 3,205,706 | 9/1965 | Tracy | 73—141 |

FOREIGN PATENTS 1,115,052  10/1961  Germany.

RICHARD C. QUEISSER, *Primary Examiner.*

JAMES J. GILL, *Examiner.*

J. J. SMITH, J. H. WILLIAMSON,
*Assistant Examiners.*